United States Patent
Bentmar et al.

[11] Patent Number: 6,165,574
[45] Date of Patent: Dec. 26, 2000

[54] PACKAGING LAMINATE INCLUDING A MOISTURE-SENSITIVE GAS BARRIER LAYER, A METHOD OF PRODUCING THE PACKAGING LAMINATE, AS WELL AS PACKAGING CONTAINERS

[75] Inventors: Mats Bentmar, Svedala; Mikael Berlin, Lund; Ib Leth, Kavlinge, all of Sweden

[73] Assignee: Tetra Laval Holdings & Finance S.A., Pully, Switzerland

[21] Appl. No.: 09/402,215

[22] PCT Filed: Apr. 1, 1998

[86] PCT No.: PCT/SE98/00606

§ 371 Date: Dec. 2, 1999

§ 102(e) Date: Dec. 2, 1999

[87] PCT Pub. No.: WO98/45111

PCT Pub. Date: Oct. 15, 1998

[51] Int. Cl.[7] .............................. B32B 31/12; B29C 47/06
[52] U.S. Cl. ........................ 428/36.7; 428/35.4; 428/36.6; 428/500; 428/515; 264/173.11; 156/244.11; 156/244.27
[58] Field of Search ................... 428/35.4, 36.6, 428/36.7, 500, 515; 264/173.11; 156/244.11, 244.27

[56] References Cited

U.S. PATENT DOCUMENTS

| | | | |
|---|---|---|---|
| 3,861,994 | 1/1975 | Stark | 161/161 |
| 4,004,727 | 1/1977 | Rausing et al. | 229/4.5 |
| 4,256,791 | 3/1981 | Holmström et al. | 428/77 |
| 4,405,400 | 9/1983 | Petersen-Hoj | 156/244.11 |
| 4,424,260 | 1/1984 | Pupp | 428/461 |
| 4,460,425 | 7/1984 | Rausér et al. | 156/244.23 |
| 4,461,667 | 7/1984 | Pupp | 156/244.11 |
| 4,525,134 | 6/1985 | McHenry et al. | 425/130 |
| 4,657,614 | 4/1987 | Andersson | 156/244.11 |
| 4,994,310 | 2/1991 | Frisk et al. | 428/34.2 |
| 5,122,410 | 6/1992 | Löfgren et al. | 428/216 |
| 5,133,999 | 7/1992 | Löfgren et al. | 428/34.2 |
| 5,248,534 | 9/1993 | Rosen | 428/36.7 |
| 5,330,845 | 7/1994 | Andersson et al. | 428/487 |
| 5,478,618 | 12/1995 | Rosén | 428/35.4 |
| 5,508,075 | 4/1996 | Roulin et al. | 428/35.7 |
| 5,520,970 | 5/1996 | Christensson et al. | 428/342 |
| 5,552,002 | 9/1996 | Farrell et al. | 156/82 |

FOREIGN PATENT DOCUMENTS

| | | |
|---|---|---|
| 0684184 A2 | 11/1995 | European Pat. Off. |
| 02752647 | 6/1979 | Germany. |
| 3011630 A1 | 10/1981 | Germany. |

*Primary Examiner*—Richard Weisberger
*Attorney, Agent, or Firm*—Burns, Doane, Swecker & Mathis, L.L.P.

[57] ABSTRACT

A sheet- or web-shaped packaging blank (10) of a laminate including a core layer (11) and a layer of a moisture-sensitive gas barrier material (13), in which the gas barrier layer is disposed between two layers (14, 15) of a moisture-resistant material and is omitted in narrow strip shaped regions (16a, 16b) along both longitudinal edges of the packaging blank. The moisture-sensitive gas barrier layer (13) will by such means be encapsulated between moisture-resistant material and well protected against the action of ambient moisture also along the longitudinal, exposed incision edges of the packaging blank. The moisture-sensitive gas barrier material preferably substantially comprises PVOH and is applied preferably by means of coating in the form of an aqueous dispersion and subsequent drying.

11 Claims, 2 Drawing Sheets

PACKAGING LAMINATE INCLUDING A MOISTURE-SENSITIVE GAS BARRIER LAYER, A METHOD OF PRODUCING THE PACKAGING LAMINATE, AS WELL AS PACKAGING CONTAINERS

TECHNICAL FIELD

The present invention relates to a sheet- or web-shaped packaging blank of a laminate including a core layer and a layer of a moisture-sensitive gas barrier material, the packaging blank displaying longitudinal edges being intended for reforming into a container or tube by uniting the longitudinal edges in an overlap longitudinal joint. The present invention also relates to a method of producing such a sheet- or web-shaped packaging blank, and also to packaging containers produced from the packaging blank according to the present invention.

BACKGROUND ART

Within the packaging industry, use has long been made of packages of a single-use nature (so-called single-use disposable packages) for packing and transporting liquid foods. Conventional single-use packages are often produced from a flexible laminate material including a configurationally rigid but foldable core layer of paper or paperboard, or alternatively of a polymer, and outer layers of a liquid-tight polymer possessing superior thermosealing properties.

Such packaging containers are often produced in that a web of packaging laminate is reformed into a tube by the longitudinal edges of the web being united to one another, whereafter the tube is filled with the intended contents and thermosealed along narrow, transverse mutually spaced apart sealing zones. The sealed off portions of the tube containing the contents are then separated from the tube by means of incisions in the above-mentioned sealing zones and are formed, possibly by folding, into optional geometric configuration, depending upon how the sealing joints are oriented.

Alternatively, production of packaging containers may be put into effect in that a sheet-shaped blank of the packaging laminate is fold-formed and thermosealed into a container, whereafter the container is supplied with the intended contents and is sealed by means of fold formation and sealing of the upper region of the container.

Such a laminated packaging material is often supplemented with one or more additional layers of material possessing superior gas barrier properties in order to be able to be used also for packaging containers intended for food products which are sensitive to oxygen gas.

A common and efficient oxygen gas barrier material is aluminium which, in the form of a foil (Alifoil), may be disposed in a packaging laminate. Use of Alifoil entails, however, a number of disadvantages. Because of its slight flexibility, flexural and tensile cracks occur in the fold regions in a fold-formed package, as a result of which the packaging container is untight vis-à-vis penetrating oxygen gas. Moreover, Alifoil is difficult to handle on recycling or combustion or packaging materials, and consumed packaging containers are thereby less advantageous from the point of view of the environment.

In order to avoid the drawbacks inherent in Alifoil, oxygen gas barriers of polymer materials may be employed instead, such as, for example, ethylene vinyl alcohol (EVOH), or polyvinyl alcohol (PVOH) which are also to be preferred from the point of view of the environment, since they have relatively good properties as regards biological degradability.

However, it is a problem that the oxygen gas barrier properties in a layer of EVOH or PVOH are negatively affected by moisture and liquid and are thereby a relatively unreliable oxygen gas barrier in a packaging container intended for long transport, lengthy storage and cold storage of liquid foods.

According to Swedish Patent No. 440 519, a layer of polyvinyl alcohol emulsion is applied by means of coating direct onto one side of the core layer, which in this case consists of paper or paperboard, whereafter the applied aqueous polyvinyl alcohol layer is dried for the formation of a continuous, blanket layer. However, the raw, coarse surface of the paper core layer requires unnecessarily large application quantities of PVOH in order to achieve a blanket covering layer, at the same time as the PVOH layer is in direct contact with the moisture-sensitive paper or paperboard layer and is thereby not protected from the action of moisture via this layer.

According to Swedish Patent Application No. SE 95034948, these problems are obviated by laminating the moisture-sensitive oxygen gas barrier layer between two moisture-resistant material layers, disposed on the one side of the core layer, such as, for example, layers of extrudable thermoplastic, preferably polyethylene. The first moisture-resistant material layer between the core layer and the PVOH layer functions, on the one hand, as a smoothening layer, in which event the PVOH may be made thinner but nevertheless blanket covering, and, on the other hand, as a barrier against moisture penetration from the core layer. The second moisture-resistant material layer protects against the action of moisture from the other side of the PVOH layer.

There still remains the drawback inherent in a moisture-sensitive barrier layer in the region along the longitudinal edges of a packaging blank intended for the overlapping longitudinal joint seal. Normally, the longitudinal incision edges of the packaging blank are freely exposed in the longitudinal joints of a packaging container, for which reason the penetration of moisture via a porous, moisture-sensitive core layer or via the moisture-sensitive barrier layer proper may be able to take place, both in contact with the liqueform contents on the inside of the packaging container or in contact with moisture or a damp environment on the outside of the packaging container. In the area of the longitudinal joints of the packaging container, the gas barrier properties of the packaging material are thus still negatively influenced by surrounding moisture and damp, with a poor product protection during lengthy storage as a result.

OBJECTS OF THE INVENTION

One object of the present invention is therefore to realise a blank of a packaging laminate of the type described by way of introduction, which does not suffer from the problems and drawbacks of the type inherent in the prior art technology.

A further object of the present invention is to realise a packaging blank possessing improved oxygen gas barrier properties, comprising a core layer and a moisture-sensitive gas barrier layer, in which the gas barrier layer is wholly protected against the penetration of moisture from the ambient surroundings along the longitudinal edges of the blank.

Yet a further object of the present invention is to realise a packaging container blank of a well-integrated laminate including a core layer and a moisture-sensitive gas barrier layer, in which packaging blank the moisture-sensitive gas barrier material is wholly protected against the liquid-containing filled contents in a packaging container produced from the blank, and also against moisture in the ambient surroundings in which the packaging container is stored.

Still a further object of the present invention is to realise a simple, rational method of producing the packaging blank from a laminate material possessing improved gas barrier properties including a moisture-sensitive gas barrier material, in which blank the longitudinal edges are protected against the penetration of moisture and liquid from the ambient surroundings.

Yet a further object of the present invention is to realise simple, easily produced packaging container possessing improved gas barrier properties in the longitudinal joint regions.

These and other objects have been attained by means of a laminated packaging material bearing the characterizing features as set forth in appended in claim 1. Preferred embodiments of the packaging laminate according to the present invention are further apparent from subclaims 2 to 5.

The method according to the present invention bears the characterizing features as set forth in appended independent claim 6. Variations and modifications of the method according to the present invention are apparent from appended subclaims 7 to 10.

A packaging container according to the present invention bears the characterizing features as set forth in appended claim 11.

SUMMARY OF THE INVENTION

A packaging blank according to the present invention is preferably a web-shaped blank of a packaging laminate for reforming into a longitudinally sealed tube which is continuously filled with product and is sealed along narrow, transverse, mutually spaced apart sealing zones, for the formation of filled packaging containers. However, the present invention may also be applied in the production of sheet-shaped packaging blanks, it being most simple and rational to take as the point of departure a ready-laminated, web-shaped packaging blank which is divided into sheets of suitable length and configuration.

The core layer in a packaging blank according to the present invention suitably consists of a paper or paperboard material of packaging quality, but may also consist of some type of polymer.

According to one preferred embodiment, a packaging laminate blank according to the present invention includes outer, liquid-tight layers of a thermosealable thermoplastic, preferably polyethylene, for example low density polyethylene (LDPE). The outer thermoplastic layer or layers impart to the packaging laminate protection against the penetration of moisture and liquid from the one or both sides of the packaging laminate and, at the same time, render the packaging laminate thermosealable by conventional thermosealing, which is realised in that plastic layers which are turned to face towards one another are supplied with heat and pressure so that they fuse together at the surface and thus are effectively united for the formation of mechanically strong, liquid-tight sealing joints.

Further, the packaging laminate according to the invention includes an oxygen gas barrier layer of a moisture-sensitive polymer, such as, for example, ethylene vinyl alcohol (EVOH), copolymer or polyvinyl alcohol (PVOH). PVOH, which is the most preferred polymer, possesses extremely good oxygen gas barrier properties. In relation to EVOH, PVOH may possess up to ten times better oxygen gas barrier properties and also make for improved adhesion to surrounding layers. Preferably, the oxygen gas barrier layer includes PVOH with a degree of hydrohysation of at least 90%.

The moisture-sensitive gas barrier layer is disposed between two layers of a moisture-resistant polymer. The selection of moisture-resistant polymer is not critical according to the present invention, even though it has proved that extrudable thermoplastic is at present most preferred for these layers. Preferably, both layers consist of a moisture-resistant polymer which is thoroughly compatible with the moisture-sensitive gas barrier polymer and creates a good moisture barrier, at the same time as it bonds with good adhesive strength to both the moisture-sensitive gas barrier layer and other adjacent layers in the laminate. The two moisture-resistant layers may consist of the same or different polymers. For example, one polyethylene may be employed as moisture-resistant polymer, preferably LDPE.

In order further to increase the resistance of the oxygen gas barrier layer to moisture, a cross linking agent may be added. Suitable cross linking agents for EVOH or PVOH are dialdehydes, such as, for example, glyoxal or glutar aldehyde, and also acid anhydrides. A combination consisting of a polysaccharide, for example chitosan, and a dialdehyde or acid anhydride may be added in order to achieve cross linking, as described in Danish Patent Application No. 1451/95. Other suitable cross linking agents are well-known to a person skilled in the art. Possible cross linking agents are added to the oxygen gas barrier layer preferably in a quantity corresponding to approximately 0.5–10 mol-%.

By a special method of applying the above-mentioned gas barrier layer in the form of an aqueous dispersion of the polymer included in the gas barrier onto a subjacent layer of a moisture-resistant polymer possessing superior liquid barrier properties, preferably by means of coating and subsequent drying to the desired moisture content, surprisingly good adhesion bonding between the two layers will be achieved.

Further improved adhesion may be achieved by the admixture of an adhesive in the oxygen gas barrier layer, or by applying interjacent layers of adhesive between the layers. Examples of suitable adhesives according to the present invention are ethylene vinyl acetate (EVA) or polyvinyl acetate (PVAC). The admixture of adhesive in the oxygen gas barrier layer preferably takes place in a quantity of up to approximately 50 weight percent, more preferably 20–30 weight percent. An interjacent adhesive layer is applied preferably in the form of an aqueous dispersion, most preferably by means of coating with subsequent drying.

Improved adhesion may also be achieved by means of known surface modification techniques, such as, for example, corona or flame treatment of the surface intended for coating, i.e. of the subjacent, moisture-resistant material layer.

According to another embodiment of the present invention, the moisture-sensitive gas barrier layer is applied by means of extrusion, like the adjacent, moisture-resistant layers.

BRIEF DESCRIPTION OF THE ACCOMPANYING DRAWINGS

The above-outlined aspects of the present invention will now be described in greater detail hereinbelow, with reference to the accompanying Drawings, in which:

FIG. 1 schematically illustrates a cross section of both of the longitudinal edges of a packaging blank 10 according to the present invention;

FIG. 2 schematically illustrates a cross section of both of the longitudinal edges of a packaging blank 20 according to the present invention;

FIG. 3 schematically illustrates a cross section of a longitudinal joint seal of both of the longitudinal edges of a packaging blank according to the present invention; and FIG. 4 schematically illustrates one preferred embodiment of a method of producing a packaging blank according to the invention.

While the present invention will be described in greater detail hereinbelow with reference to specific embodiments shown on the Drawings, it will be obvious to a person skilled in the art that various modifications and variations may be put into effect without departing from the inventive concept as this is defined in the appended claims.

DESCRIPTION OF PREFERRED EMBODIMENTS

Figure 1:
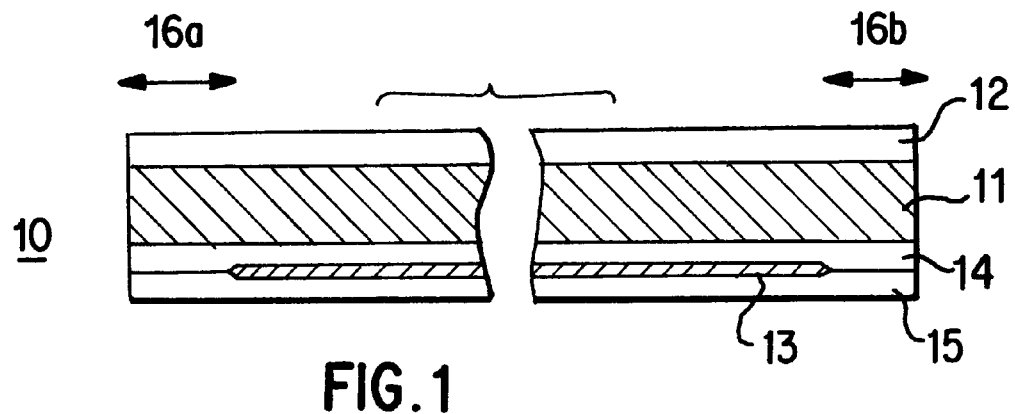

FIG. 1 thus shows a cross section of a packaging blank 10 according to the present invention. The packaging blank 10 is produced from a laminate including a core layer 11 of paper or paperboard, an outer, liquid-tight and thermosealable layer of polyethylene, preferably low density polyethylene (LDPE) 12, a gas barrier layer of PVOH 13, and a layer of a moisture-resistant thermoplastic polymer, such as, for example, LDPE on each side 14, 15, respectively of the gas barrier layer.

The outer, liquid-tight layer 12 is disposed on that side of the packaging laminate 10 which is intended to be turned to face outwards in a packaging container produced from the packaging laminate, while correspondingly, the outer layer 15 is disposed on that side of the packaging laminate which is intended to be turned to face inwards in a packaging container. The layer 15 may consist of two or more part layers of the same moisture-resistant thermosealable polymer, in order to optimise, for instance, adhesion properties and aroma barrier properties.

The layers 12 and 15 thus function according to the preferred embodiment both as outer, liquid-tight barrier layer and are thermosealable to one another, at the same time as the layer 15 from the one side protects the moisture-sensitive gas barrier layer 13 against moisture and liquid.

Along both longitudinal edges of the packaging laminate, the laminate is free of PVOH, i.e. free of gas barrier layer 13, within a narrow, strip shaped longitudinal region 16a and 16b along each respective edge, in which the two thermoplastic, liquid-tight layers 14 and 15 are sealed to one another. The narrow longitudinal regions are so wide that the two layers 14 and 15 may be sealed to one another along the edges and thus encapsulate in moisture-tight fashion and protect the gas barrier layer 13 against exposure to moisture along the longitudinal incision edges of the packaging blank. The narrow longitudinal regions 16a and 16b free of gas barrier layer may vary in width between approximately 3 and 10 mm, and are preferably approximately 5–7 mm wide. If the regions are made far too narrow, sufficiently strong lamination or fusion of the layers 14 and 15 will not be achieved, with poorer protection for the layer 13 as a result. If these regions are made far too wide, poorer gas barrier properties will be the result in a longitudinally sealed packaging container made from the packaging blank, because of the fact that a large portion of the longitudinal joint region lacks a gas barrier layer.

The polyvinyl alcohol layer, i.e. the gas barrier layer 13, is applied on the layer 14 in a quantity of approximately 1–10 g/m$^2$, preferably 3–6 g/m$^2$.

Figure 2:
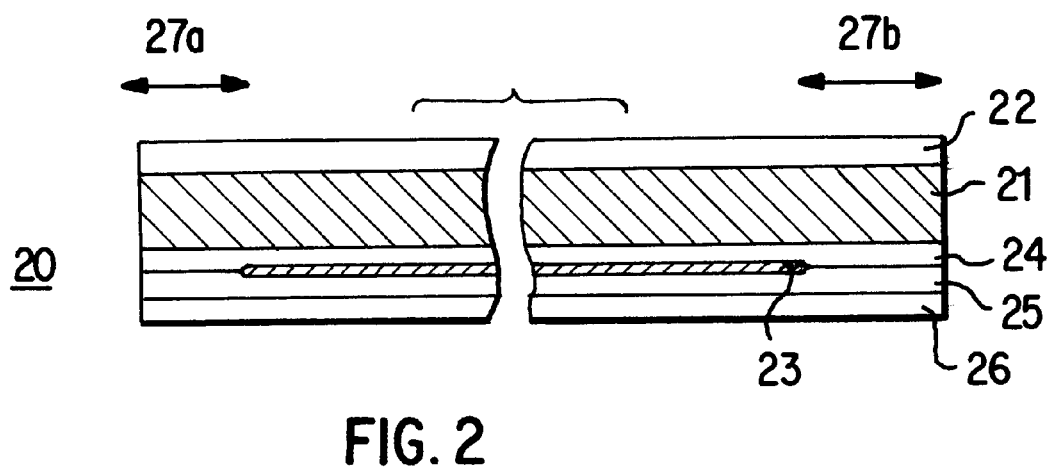

FIG. 2 similarly shows a cross section of a packaging blank 20 according to the present invention produced from a laminate including the same type of core layer 21, outer layer 22 and gas barrier layer 23 as in FIG. 1. In the packaging blank 20, the gas barrier layer 23 is laminated between two layers of thermoplastic, moisture-resistant polymer of another type than in FIG. 1, for example a polymer of the type acid-modified or acid copolymerised polyethylene, 24 and 25, respectively. On that side of the laminate which is turned to face inwards in a packaging container produced from the packaging blank, an additional inside layer 26 of polyethylene, preferably LDPE, is disposed. The layer 26 is thus thermosealable to the outer layer 22 on the "outside" of the packaging blank. In the same manner as in FIG. 1, the gas barrier layer 23 has been omitted along the longitudinal edges of the packaging blank where the two layers 24 and 25 are laminated to one another.

Figure 3:
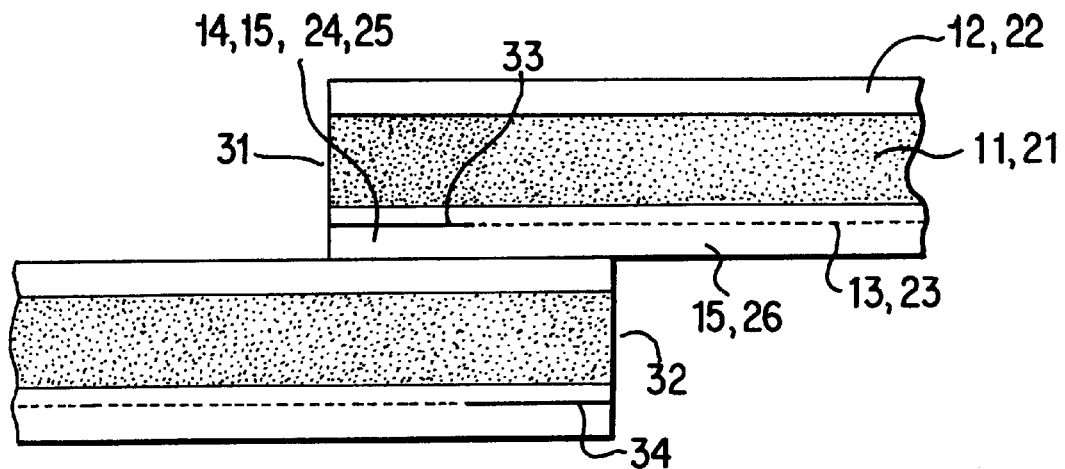

FIG. 3 shows in cross section how the longitudinal edges of the packaging blank 10 and 20, respectively, overlap one another and how the laminate structure appears in the longitudinal joint region of a longitudinally sealed packaging container. For purposes of clarity, the same reference numerals as in FIGS. 1 and 2 have been employed to designate the same or corresponding details in FIG. 3.

Since the gas barrier layer 13, 23, respectively has been omitted from the laminate along the longitudinal edges of the packaging blank, the layers 14 and 15; and 24, 25, respectively are laminated to one another, the gas barrier layer being encapsulated and protected against exposure to penetrating moisture in the incision edges 31 and 32 of the packaging blank. The two longitudinal strip shaped edge regions 33 and 34 of the packaging blank are thus free of gas barrier layer 13 and 23, respectively, and are approximately 3–10 mm, preferably approximately 5–7 mm wide.

Figure 4:
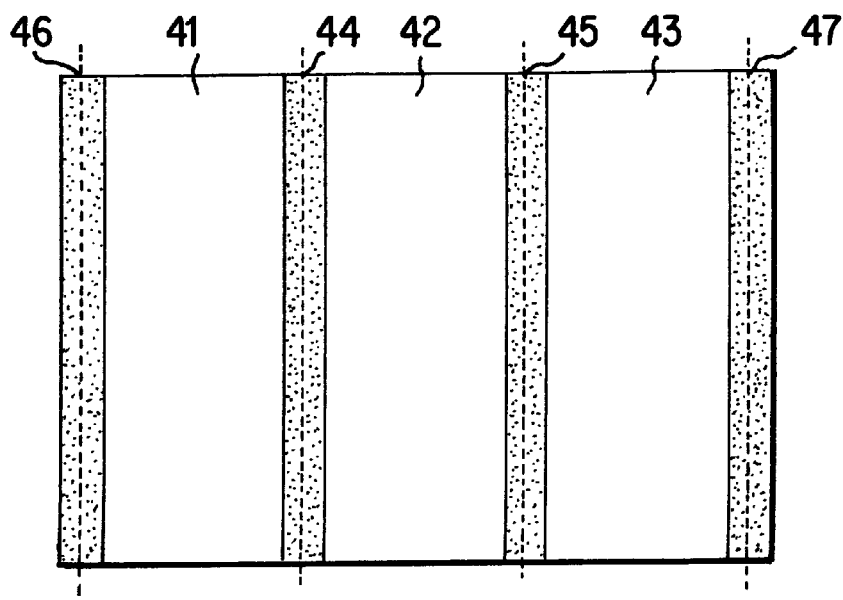

FIG. 4 schematically illustrates one preferred embodiment of the method according to the invention where a wide packaging laminate web which, during the production process, will be divided up into a plurality of narrow part-webs corresponding to the width of one blank of a packaging container, is coated with an aqueous dispersion of a moisture-sensitive gas barrier material, preferably PVOH, in longitudinal lines 41, 42, 43 of lesser with than the width of the intended part-webs so that narrow, strip shaped regions along the incision lines 44, 45 for dividing the first wide web into a plurality of narrower part-webs, and narrow strip shaped regions along the longitudinal edges 46, 47 of the web are left free of gas barrier material. Thus, the gas barrier material is coated in a strip pattern on a semi-manufactured web-shaped laminate of a core layer of paper or paperboard, coated with thermoplastic, moisture-resistant layers on each side, and is dried, whereafter the entire width of the web-shaped laminate is blanket coated with an additional moisture-resistant thermoplastic layer. Consequently, the coated and dried lines with gas barrier material of close to part-web width will be enclosed or encapsulated between thermoplastic, liquid-tight layers also along the edges of the part-webs divided by incisions, i.e. the web-shaped packaging blanks.

As is apparent from the foregoing description, the present invention thus attains the established objects readily and efficiently in that the moisture-sensitive gas barrier layer is omitted along the longitudinal edges of the packaging blank so that the gas barrier layer is encapsulated in and sealed by the two adjacent layers on either side of the gas barrier layer, along the incision edges of the blank exposed to moisture.

In addition, the present invention realises a simple, rational method of producing packaging blanks according to the invention, and also packaging containers possessing improved oxygen gas tightness properties, produced from packaging blanks according to the present invention.

What is claimed is:

1. A sheet- or web-shaped packaging blank of a laminate including a core layer and a layer of moisture-sensitive gas barrier material, said packaging blank displaying longitudinal edges and being intended for reforming into a container or tube by uniting the longitudinal edges in an overlap longitudinal joint, characterized in that the moisture-sensitive gas barrier layer is disposed between two moisture-resistant material layers and are localised only to regions of the surface of the packaging blank which are located outside narrow regions along each respective longitudinal edge of the packaging blank.

2. The sheet- or web-shaped packaging blank as claimed in claim 1, characterized in that the narrow regions along the longitudinal edges of the packaging blank are between 3 and 10 mm wide.

3. The sheet- or web-shaped packaging blank as claimed in claim 1, characterized in that the moisture-sensitive gas barrier layer substantially consists of polyvinyl alcohol.

4. The sheet- or web-shaped packaging blank as claimed in claim 1, characterized in that the core layer consists of paper or paperboard.

5. The sheet- or web-shaped packaging blank as claimed in claim 1, characterized in that the moisture-resistant material layers substantially consist of polyethylene.

6. A method of producing a sheet- or web-shaped packaging blank from a laminate including a core layer and a moisture-sensitive gas barrier layer, said packaging blank displaying longitudinal edges and being intended for reforming into a container or tube by uniting the longitudinal edges into an overlap longitudinal joint, characterized in that the moisture-sensitive gas barrier material is disposed in a layer between a first and a second moisture-resistant material layer on each side of the gas barrier layer, so that it is localised only to regions of the surface of the packaging blank which are located outside narrow regions along each respective longitudinal edge of the packaging blank.

7. A method of producing a sheet- or web-shaped packaging blank from a laminate including a core layer and a moisture-sensitive gas barrier layer, said packaging blank displaying longitudinal edges and being intended for reforming into a container or tube by uniting the longitudinal edges into an overlap longitudinal joint, characterized in that the moisture-sensitive gas barrier material is coated on a first, subjacent moisture-resistant material layer only in such regions of the surface of the packaging blank as are located outside narrow regions along each respective longitudinal edge of the packaging blank; and that the entire surface of the laminate, including the moisture-sensitive gas barrier layer, is thereafter coated with a second, blanket moisture-resistant material layer.

8. The method as claimed in claim 6, characterized in that the moisture-sensitive gas barrier material is applied by means of coating in the form of a dispersion and thereafter dried.

9. The method as claimed in claim 7, characterized in that the moisture-sensitive gas barrier material is applied on a first wide web of a semi-manufactured laminate including a core layer and an uppermost layer of a moisture-resistant material in blanket fashion on those regions of the surface of the web as are located outside narrow longitudinal regions around the incision lines for dividing up the first wide web into two or more narrower part-webs and narrow regions along the longitudinal edges of the web in a first step; that the first, wide web, including the gas barrier material applied in part-web pattern is thereafter blanket coated with a layer of a moisture-resistant material in a second step; and that the ready-laminated web is divided by incision along incision lines in a third and last step.

10. The method as claimed in claim 9, characterized in that the narrow, longitudinal regions are between 3 and 10 mm wide.

11. Packaging containers produced from a packaging blank as claimed in claim 1.

* * * * *